United States Patent
Gunter

(10) Patent No.: US 10,841,185 B2
(45) Date of Patent: Nov. 17, 2020

(54) PLATFORM-INTEGRATED IDE

(71) Applicant: Pivotal Software, Inc., San Francisco, CA (US)

(72) Inventor: Matthew Everett Gunter, Tampa, FL (US)

(73) Assignee: Pivotal Software, Inc., San Francisco, CA (US)

( * ) Notice: Subject to any disclaimer, the term of this patent is extended or adjusted under 35 U.S.C. 154(b) by 0 days.

(21) Appl. No.: 16/138,271

(22) Filed: Sep. 21, 2018

(65) Prior Publication Data
US 2020/0097390 A1   Mar. 26, 2020

(51) Int. Cl.
G06F 9/44      (2018.01)
H04L 12/24     (2006.01)
G06F 9/54      (2006.01)
G06F 11/36     (2006.01)

(52) U.S. Cl.
CPC ............ *H04L 41/5054* (2013.01); *G06F 9/54* (2013.01); *G06F 11/3664* (2013.01); *G06F 11/3684* (2013.01); *G06F 11/3688* (2013.01); *G06F 11/3692* (2013.01); *H04L 41/5045* (2013.01)

(58) Field of Classification Search
CPC ............ H04L 41/5041; H04L 41/5054; H04L 41/5032; H04L 41/12; H04L 47/70; H04L 41/5045; G06F 11/3612; G06F 11/368; G06F 11/3688; G06F 11/0793; G06F 9/5061; G06F 8/65; G06F 11/3684; G06F 16/9024; G06F 8/36; G06F 8/34
See application file for complete search history.

(56) References Cited

U.S. PATENT DOCUMENTS

| | | | |
|---|---|---|---|
| 9,645,914 B1* | 5/2017 | Zhang | G06F 8/65 |
| 2004/0250156 A1* | 12/2004 | Weichselbaum | G06F 11/0793 714/2 |
| 2009/0288066 A1 | 11/2009 | Jeong et al. | |
| 2012/0102572 A1* | 4/2012 | Murakami | G06F 9/5061 726/28 |

(Continued)

OTHER PUBLICATIONS

'Cloud Foundry Documentation' [online], "Using Application Health Checks," Aug. 28, 2018, [retrieved on Sep. 28, 2018], retrieved from: URL <https://docs.cloudfoundry.org/devguide/deploy-apps/healthchecks.html#healthcheck-lifecycle>, 3 pages.

(Continued)

*Primary Examiner* — Tuan A Vu
(74) *Attorney, Agent, or Firm* — Fish & Richardson P.C.

(57) ABSTRACT

Methods, systems, and apparatus, including computer programs encoded on a computer storage medium, for code testing. In one aspect, a method includes receiving, by a code editor of an IDE, updated source code for a first service and an associated set of tests; deploying, by the IDE, an updated first service based on the updated source code to a cloud environment and the test case to a test agent; running an instance of the updated first service in the cloud environment; performing, by the test agent, the set of tests on the running instance of the updated first service; receiving, by the IDE, data representing the test results; and displaying, by the IDE, the data representing the test results on a user interface.

29 Claims, 3 Drawing Sheets

(56) References Cited

U.S. PATENT DOCUMENTS

| | | | | |
|---|---|---|---|---|
| 2013/0152047 | A1* | 6/2013 | Moorthi | G06F 11/368 |
| | | | | 717/124 |
| 2016/0124742 | A1* | 5/2016 | Rangasamy | H04L 47/70 |
| 2018/0039494 | A1* | 2/2018 | Lander | G06F 11/3688 |
| 2018/0039565 | A1 | 2/2018 | Rajagopalan et al. | |
| 2018/0107586 | A1 | 4/2018 | Vyas et al. | |
| 2018/0270122 | A1* | 9/2018 | Brown | H04L 41/5032 |
| 2018/0316551 | A1* | 11/2018 | Subramani Nadar | |
| | | | | H04L 41/5054 |
| 2018/0324204 | A1* | 11/2018 | McClory | H04L 41/5041 |
| 2019/0052551 | A1* | 2/2019 | Barczynski | H04L 41/12 |
| 2019/0065345 | A1* | 2/2019 | Patel | G06F 11/3612 |

OTHER PUBLICATIONS

'Github.com' [online], "Vapor-Ware / KSYNC," 2018, [retrieved on Sep. 28, 2018], retrieved from: URL <https://github.com/vapor-ware/ksync>, 7 pages.

'ZeroTurnaround.com' [online], "JRebel with Cloud Foundry," available on or before Feb. 27, 2018, via Internet Archive: Wayback Machine URL <https://web.archive.org/web/20180227192202/http://manuals.zeroturnaround.com:80/jrebel/remoteserver/pivotal.html>, [retrieved on Sep. 28, 2018], retrieved from: URL <https://manuals.zeroturnaround.com/jrebel/remoteserver/pivotal.html?highlight=cloud%20foundry>, 1 page.

Richardson et al., "Microservices—From Design to Deployment", NGINX, May 2016, 80 pages.

PCT International Search Report and Written Opinion in International Appln. No. PCT/US2019/052279, dated Feb. 5, 2020 14 pages.

\* cited by examiner

PLATFORM-INTEGRATED IDE

BACKGROUND

This specification relates to the field of computer code development and testing.

Code development and testing are generally done in a sequential and batch-oriented approach. The code is first developed in a simple text editor or developed and tested in a local integrated development environment (IDE), and then compiled and deployed into a production environment or a production-like environment for further testing. Software typically is moved through different environments for different phases of its life cycle. Outside of a developer's local machine, the typical environments are development, testing, staging, production A and, for disaster recovery or serving a distant geography, production B environments. These environments typically become more "production-like" as the software progresses through environments. A Platform-as-a-Service (PaaS)-style cloud environment provide services and efficiencies to hosted apps that allow the pre-production environments (e.g., "spaces" or "namespaces") leading up to full production to be more similar to production than in the past.

Implementing applications as smaller modular units—microservices, as opposed to as monolithic applications—is a software development technique in which a software application is implemented as a group of lightweight, independent, and interacting services. The above efficiencies make this technique cost-effective and the use of microservices improves code modularity, speed of development, and scalability, but complicates code testing, because the testing of a single service can depend on a large group of other services or on the specific features of the cloud environment itself. Due to the challenges with creating and testing these separately deployable and inter-dependent services, the benefits of the microservice approach is not being broadly achieved.

SUMMARY

This specification describes technologies for a platform-integrated IDE that can deploy incremental code changes to a production-like cloud environment and cause a test agent, running locally or in the cloud environment, to test the updated applications and to collect and display metrics from the environment about the test execution, e.g., latency, memory utilization, and so on.

In general, one innovative aspect of the subject matter described in this specification can be embodied in methods that include the actions of receiving, by a code editor of an integrated development environment (IDE), updated source code for a first service and an associated set of tests, wherein the first service was running in a cloud environment before the source code was updated; deploying, by the IDE, an updated first service based on the updated source code to a cloud environment and the set of tests to a test agent; running an instance of the updated first service in the cloud environment, wherein the updated instance of the first service relies on the cloud environment to provide system resources, and wherein the updated instance of the first service uses a network of other services that expose application programming interface (API) endpoints to make application functionality available to one or more clients; performing, by the test agent, the set of tests on the running instance of the updated first service, wherein the set of tests corresponds to the updated source code, and wherein performing the set of tests generates test results; receiving, by the IDE, data representing the test results; and displaying, by the IDE, the data representing the test results on a user interface.

The subject matter described in this specification can be implemented in particular embodiments so as to realize one or more of the following advantages. The execution of code testing is linked to individual code sections, e.g., methods or classes, that have been updated and only the tests relevant for those sections are run. Code changes can be propagated to a production or production-like environment by incremental deployment of code changes for testing. As a result, code deployment and testing can be performed quickly without running a full test suite or rebuilding the entire application and executing the corresponding deployment steps from scratch. In addition, the associated tests are automatically executed when the associated code is updated. As a result, code changes, test sets, test execution, and metrics collection is controlled by the test agent and the IDE, which minimizes the feedback delay to the developer making the code updates.

BRIEF DESCRIPTIONS OF DRAWINGS

Like reference numbers and designations in the various drawings indicate like elements.

DETAILED DESCRIPTIONS

Figure 1:
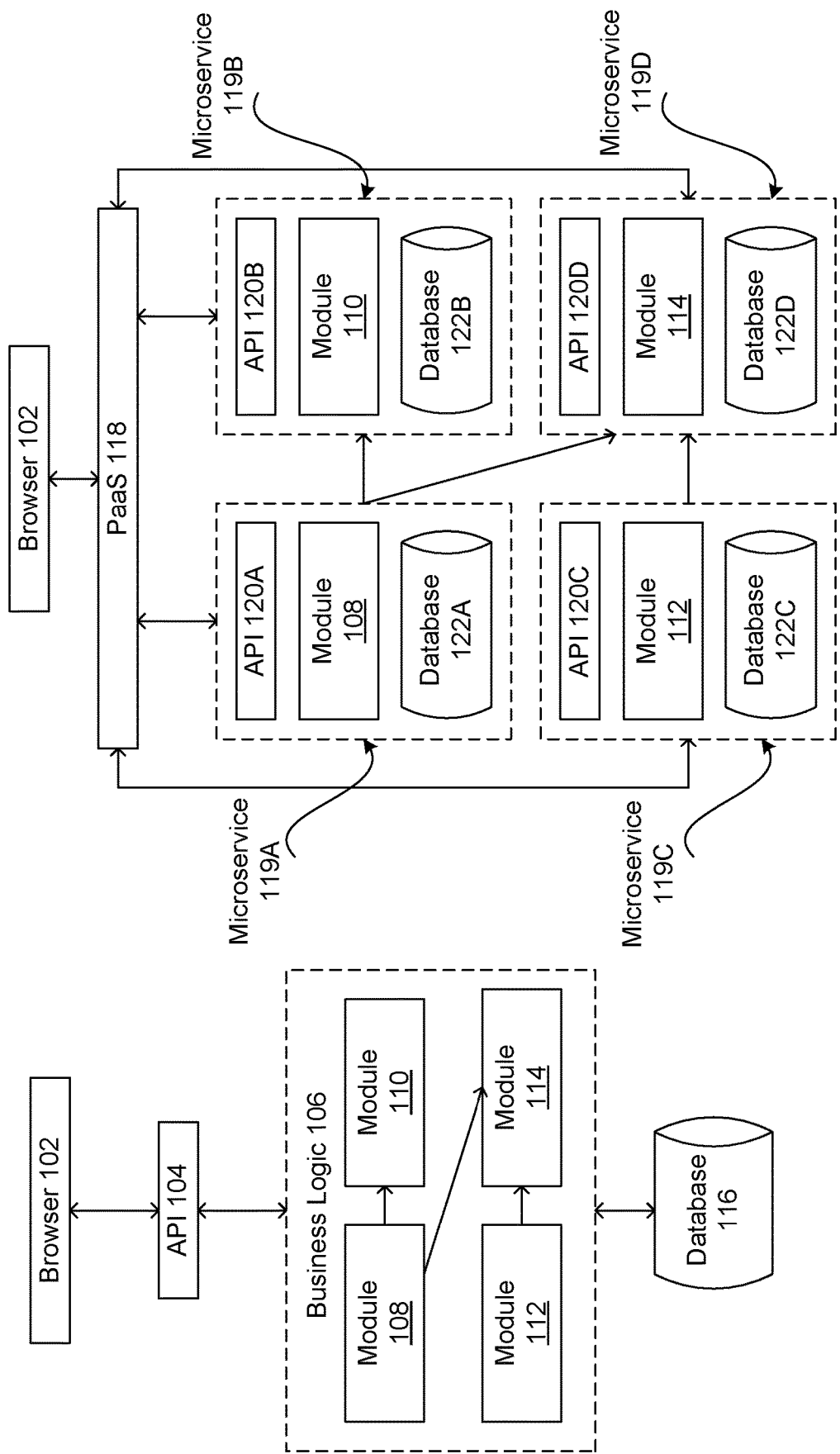
FIG. 1A is a block diagram of an example monolithic application.
FIG. 1B is a block diagram of an example microservices application.

FIG. 1A is a block diagram of an example monolithic application 101. The monolithic application is packaged and deployed as a single entity. This example monolithic application has an application programming interface (API) 104, implements business logic 106, and uses a database 116. When the API receives a request, e.g., an HTTP request from a web browser 102, the business logic accesses the database and executes specified logic based on modules 108-114 of the application to process the request. The API then presents a result to the web browser.

The monolithic application, including the business logic, is packaged and deployed as a single application. That is to say, the monolithic application is not only responsible for a particular task, but also performs the supporting steps necessary to achieve the task. In one example, the monolithic application is packaged as a self-contained, compiled, deployable file such as a Java WAR file. To deploy the application, a developer can simply copy the monolithic application to a server and the application is ready to perform end-to-end functions. Testing the monolithic application is also simple as the monolithic application already includes most, if not all business logic necessary for end-to-end testing.

As the monolith application grows in size, adding additional functionalities can be complicated, error-prone, and may require a complete rewriting of the business logic. Furthermore, the monolithic application grows large with each new addition of functions and becomes slow to launch. On the other hand, compared to monolithic applications, microservices applications have a more flexible architecture for code scalability and modularity.

FIG. 1B is a block diagram of an example application 103 implemented using a microservices architecture. The microservices application includes a group of microservices 119A-D. Each microservice implements a distinct function with its own set of adapters, e.g., an API 120A, its own business logic, e.g., a module 108, and optionally its own database, e.g., a database 122A. In some implementations, each microservice is deployed as an OS-level process, a virtual machine, or an application container, e.g., a Docker container, at runtime, and uses REST APIs or similar interoperability techniques to interact with other microservices. ("Docker" is a trademark of Docker, Inc.)

A Platform-as-a-Service (PaaS) environment 118 automates the deployment of the microservices. The PaaS environment, e.g., a Pivotal Cloud Foundry instance, procures resources to manage and deploy each microservice. For example, the environment can implement a service discovery function that enables different microservices to communicate with each other. The PaaS environment optionally provisions the database instances and other infrastructure and middleware services. The PaaS environment can also propagate connection information to the specified microservice so that the deployment can be completed successfully and the service is bootstrapped and becomes ready for testing.

Testing an application implemented as microservices can be complicated, especially when interacting services are being modified simultaneously. For example, to perform end-to-end testing of a microservice-based application, the tester will need to launch the microservice-under-test along with any other dependencies such as related microservices or infrastructure services. Due to the distributed nature of microservice-based applications, the performance and latency characteristics are important for developers to consider when making coding decisions. For example, a slow executing service could require the use of techniques such as asynchronous processing or caching of data to avoid network latency.

Figure 2:
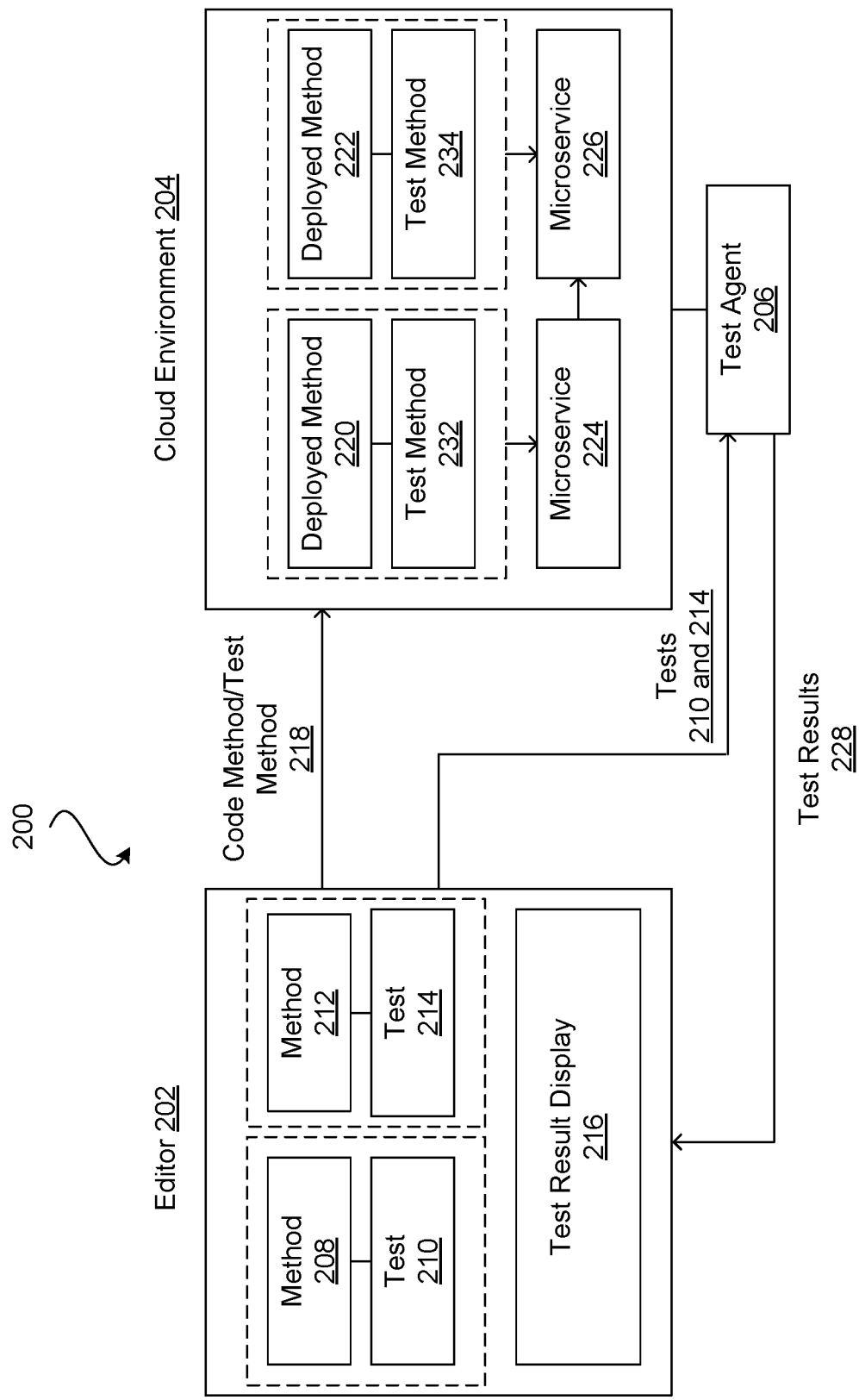
FIG. 2 is a block diagram of an example platform-integrated IDE (integrated development environment) system that provides quick test feedback based on incremental changes.

FIG. 2 is a block diagram of an example platform-integrated IDE (integrated development environment) system 200. The system includes an IDE 202, a cloud environment 204, and a test agent 206. A developer first writes code, e.g., a method 208, and a test 210 for the method, in an editor. The IDE then triggers the deployment of the code changes and the related test(s) to the cloud environment. The tests 210 and 214 have corresponding test methods 232 and 234 in the cloud environment. The test agent invokes the tests in the cloud environment on the deployed code. The tests invoke a deployed method 220, and delivers test results, e.g., test results 228, to the IDE.

Editor

The IDE is a software suite providing tools facilitating developers to write and test software. For example, the IDE can include a user interface, a compiler, a code editor, and a debugging tool. The IDE can provide code assist features such as highlighting code syntax, marking errors and warnings, refactoring source code, auto-completing/formatting source code, or running error diagnostics.

A developer can write code using a test-driven development approach in the code editor. For example, the developer can first write requirements for the method in the test, then write the method to pass the test. As a result, each method is developed with one or more associated tests in the IDE.

In some implementations, the IDE is a standalone application executing in the local machine of the developer. In this case, a developer can perform basic code testing such as unit tests in the local machine. However, since the local environment can lack many services, e.g., the deployed microservices 224 and 226, compared to the cloud environment, it is not always possible to perform end-to-end testing of the method 208 and 212 in the local machine alone.

Alternatively, the IDE is a cloud-based program. For example, the IDE can be offered as a Software-as-a-Service (SaaS) and the developer can write and test code within a web browser. With a cloud-based IDE, the developer does not have to maintain a local IDE and benefits from powerful features and integrated services such as a cloud-based terminal. The cloud-based IDE can trigger code deployments and testing similar to that performed by a local IDE. In another example, the IDE can be modular and possibly distributed with certain features such as external language servers implemented as distinct processes.

The IDE communicates with the cloud environment over a network. The network can be, for example, a local area network (LAN), a wide area network (WAN), a cellular network, a wireless network, or any combination of these. The IDE communicates code to the cloud environment and tests 218 to the test agent. For example, the developer can upload a service method and any necessary test methods such as test methods 232 and 234 to the cloud environment. In another example, the IDE can periodically check code and upload the latest changes incrementally to the cloud environment. In both cases, the corresponding test invocation metadata are communicated to the test agent.

Cloud Environment

The cloud environment is primarily a runtime technology configured to host software applications and manage their execution. For example, for a microservices application as described in FIG. 1B, the cloud environment can compile source code, deploy artifacts, build containers, provide the required dependencies, and manage network traffic. In an example, for deployed methods 220 and 222, the cloud environment hosts the required dependent microservices 224 and 226. The cloud environment can include Pivotal Cloud Foundry (PCF) instances, Pivotal Container Service (PKS) instances, and other Platform-as-a-Service (PaaS) instances.

In some implementations, the cloud environment supports multi-tenancy architecture. As a result, a single cloud environment can support one or more instances of a microservice to serve multiple customers. Each customer may then have the ability to customize the perceived application, its specific version, features, and dependencies. Customers may also be able to isolate data, networking, and processing from other customers. Building a software offering with independent microservices allows each one to be more easily adapted to support these types of requirements.

In some implementations, the cloud environment maintains metadata about the requests, executions, and tracing of executions as different applications on the cloud environment are invoked. For example, the cloud environment can generate test results on different microservices in response to a request from the test agent. Test results can include method outputs, a status indicating the success or failure of the tests, metadata indicating test durations, or metadata indicating failed steps. The IDE can filter, format, and display these test results and metadata directly in a source code viewer and the metadata can also be saved as a comment block of the source-code for future reference or for documentation and audit purposes.

Test Agent

The test agent is a software sub-module or stand-alone application that executes a set of specified tests, e.g., the tests 210 and 214 to ensure that the deployed methods perform as intended. For example, the test agent can be an aspect of the cloud environment that is automatically triggered when new code is uploaded to the cloud environment. In another example, the test agent can be integrated with a running application in the cloud environment, such as the microservice 224. In another example, the test agent can be an aspect of the IDE that executes the associated tests in coordination with the deployment of code changes.

After invoking a test and receiving a response, the test agent also collects test result metadata and delivers the combined set of information to the editor, such as in test result 228. For example, test result metadata can include the status of the tests, the timestamp of the tests, performance metrics, latency of the response, or the resulting error. This information can be converted into a user-readable format to display in a test result display 216 in the IDE.

Figure 3:
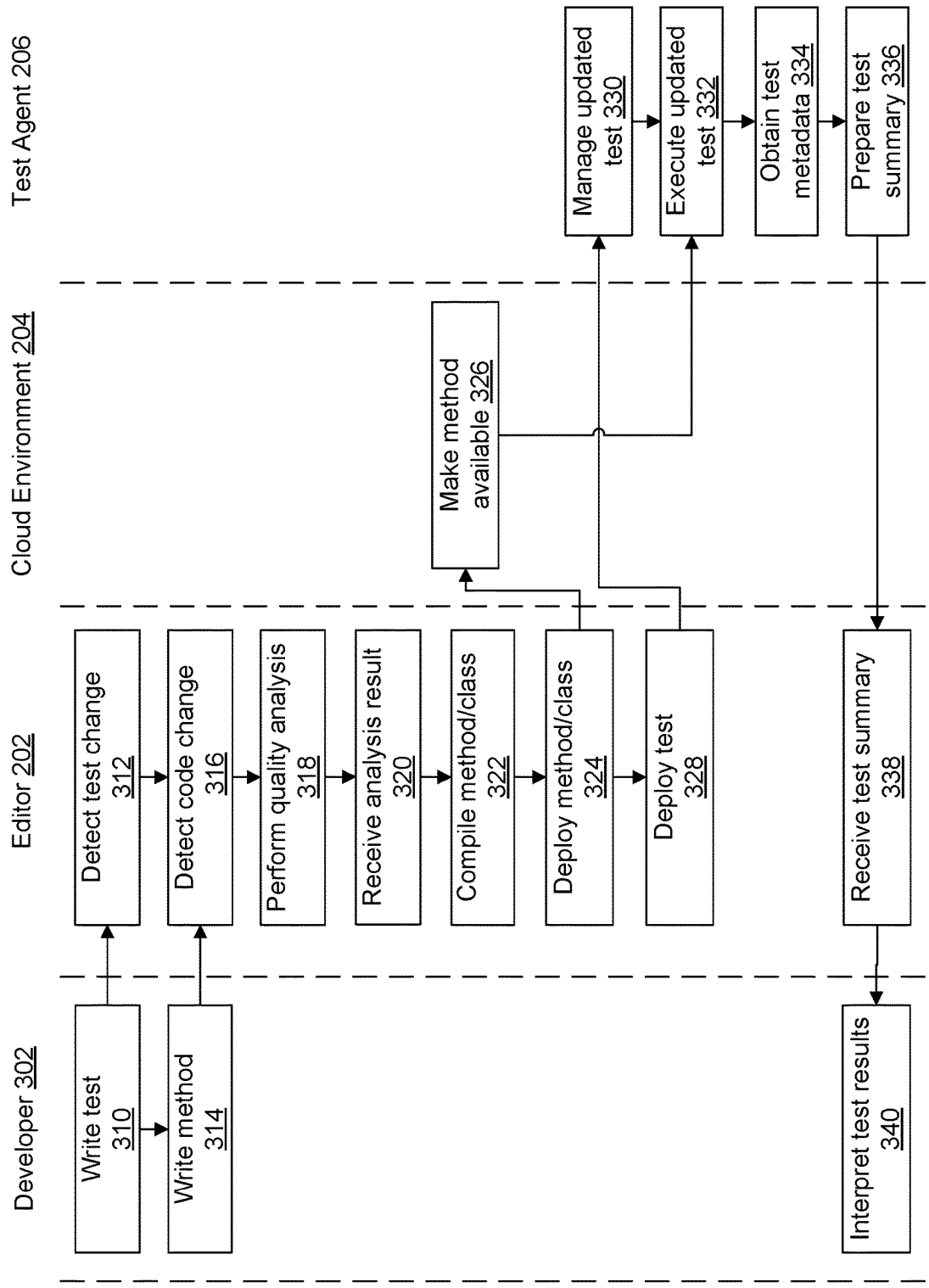
FIG. 3 is a swim diagram of an example process performed in an application development life-cycle that includes code testing.

FIG. 3 is a swim diagram of an example process 300 performed in an application development life cycle for performing code testing. FIG. 3 illustrates different operations performed by different participants in an application development life cycle, including a developer 302, an editor 202, a cloud environment 204, and a test agent 206.

The developer develops software applications in the editor. Exploiting the features of the editor and the cloud environment that will be described, the developer can adopt a test-driven development approach by using the editor to write tests for each feature of a software application (310). In response, the editor detects the code change (312). Ideally, the entire set of tests will cover all the requirements and exception conditions for the software application to be developed.

After defining the test, the developer writes a corresponding method, i.e., a method of the microservice, which will be tested by the associated test or tests (314). Of course, the developer can write tests and methods in parallel or in any order. Developers can also temporarily disable one or more tests. As requested by the developer, the editor detects a new method or updates to an existing one (316). In some cases, as described in reference to FIG. 1B, the software application is broken into a collection of microservices, with each microservice corresponding to one or more methods and tested by one or more associated tests. The developer can edit each method and test in the editor. The editor interprets developer provided information associating each method with one or more tests. For example, tests may be associated with a method or endpoint using name matching, code annotations, or some other convention that allows tests and corresponding service methods to be correlated by the editor or the test agent, and keeps this information synchronized as new tests and methods are added to the editor.

As the developer writes methods and tests, the editor can provide continuous code quality analysis and error checking (318). For example, the editor can apply predefined code inspections and notify the developer of compilation errors and warnings. The editor can highlight the sections of code that caused the errors and warnings, display detailed descriptions of the errors and warnings, and available quick fixes alongside the highlights.

After obtaining the analysis result (320), and if there is no error detected in the code or tests, the editor proceeds to compile the updated methods (322). Alternatively, if the programming language is one that does not require compilation, e.g., script languages, the editor skips this step. In some implementations, the editor can automatically deploy the updated methods and tests to the cloud environment without further requests from the developer (324). Alternatively, the editor can deploy the methods and tests on request by the developer or a different agent.

In response to detecting runnable tests and runnable methods, or in response to a request, the cloud environment makes the methods available to update an application (326). Since fully rebuilding and redeploying an entire application is usually too time-consuming, the cloud environment instead uses techniques for incremental redeployments. The restart technology provided by Spring Boot, for example, works by using two class loaders ("Spring" and "Spring Boot" are trademarks of Pivotal Software, Inc. in the U.S. and other countries). Classes that are not affected by the code update, e.g., those from third-party JARs, are loaded into a base class loader. Classes that are being actively developed are loaded into a restart class loader. When the application restarts, a new restart class loader replaces the existing restart class loader. As a result, application restarts are faster than cold starts since the base class loader is already available and populated. In some implementations, the cloud environment compiles and packages the compiled methods in individual Docker-style container images. Instead of having to rebuild a new instance for each method update, the cloud environment can reload an existing Docker container image and overwrite the existing microservice with the updated code from the editor.

In addition to deploying the updated methods to the cloud environment, the editor also communicates the modified or new tests to the test agent (328). The test agent coordinates test execution with deployment of changes. In some implementations, the test agent is a standalone application executing in the cloud environment. The test agent interfaces with different features of the deployed application and the supporting services in the cloud environment using APIs. Alternatively, the test agent can be a component of the cloud environment or the editor.

In response to detecting code changes, the test agent compiles or interprets the updated tests (330). The test agent can perform the compilation or interpretation in several ways: by instantiating a separate test module application, by invoking tests deployed as part of the microservice, or as uncompiled test metadata that is interpreted and executed directly by the test agent. The choice of approach can depend on the programming language in use and capabilities of the test agent. In one example, the test logic is embedded with the microservice application and exposed as an endpoint that can be determined by the test agent. In this approach, changes to the tests are propagated using the same "restart" mechanism and step described above for the application methods that are deployed to the cloud environment. Using this approach, the test logic is also deployed e.g., by reloading classes that support test functions. In another approach, test logic is communicated outside of the updated code, e.g., defined by a cURL command, a Groovy script, or a shell script that can be executed directly by the test agent. As a result, the test agent acquires new test logic, test parameters, or both that define the updated tests. Each test enables a test function designed for one or more deployed methods.

In one example, each test specifies an input value and precondition to a service and a corresponding expected output value and postcondition. The test agent performs the test by invoking a running instance of a service in the cloud environment with the precondition satisfied. After the test is executed, the test agent checks the postcondition and compares an output from the running instance of the service with the expected output value.

The test agent then executes the test function or functions which invoke the deployed method in the cloud environment (332). Since testing requires some time to execute, the test agent can be configured to run tests in different modes: only on-demand, when currently running tests are finished, or after a specified period of time from the last code or test update.

After the test agent executes test functions, the test agent sends test metadata back to the editor (332). For example, the test agent can send the test metadata asynchronously over a persistent connection or in response to polling by the editor. Example test metadata includes the pass or fail status of the test, the duration of the test, the steps that caused or led to a test failure, external modules called during the test, e.g., hops, external call time, e.g., latency, and any other metrics made available by the test agent from the cloud environment.

The editor, after receiving the test results and test metadata, prepares a summary of the test results (336). For example, the test summary can be an HTML, JSON, or XML document detailing the various test metadata of the test result as described above.

The developer receives the test summary and reads it in the editor (238). For example, if a test has failed, the editor can directly highlight the specific lines of code for the primary service that reported the failure along with trace information about dependent service requests such as payloads, response codes, and performance metrics. In certain implementations, results can be stored as comments in the editor near the associated methods using JSON or other parsable formats.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

The invention claimed is:

1. A method for testing code, comprising:
deploying and executing, in a cloud environment, an initial instance of a first service developed by a developer and respective instances of one or more dependent services, wherein the cloud environment provides system resources for executing the initial instance of the first service;
receiving, by a code editor of an integrated development environment (IDE) that is in data communication with the cloud environment executing the initial instance of the first service, updated source code for the first service and an associated set of tests;
in response to receiving the updated source code:
generating, by the IDE, an updated first service from the updated source code; and
determining, by the DE, one or more dependent services in the cloud environment that are not affected by the updated source code and that are in interaction with the first service in the cloud environment;
providing, by the IDE to the cloud environment, the updated first service to the cloud environment and the set of tests to a test agent executing in the cloud environment;
in response to receiving the updated first service from the IDE, executing, by the cloud environment, an instance of the updated first service in the cloud environment without redeploying the one or more dependent services that are not affected by the updated source code, wherein the instance of the updated first service relies on the cloud environment to provide system resources for executing the instance of the updated first service;
performing, by the test agent, the set of tests on the executing instance of the updated first service, wherein the set of tests corresponds to the updated source code for the updated first service, and wherein performing the set of tests generates test results that are specific to the updated source code for the updated first service;
receiving, by the IDE, data representing the test results; and
displaying, by the IDE, the data representing the test results on a user interface as feedback to the developer of the first service.

2. The method of claim 1, wherein executing, by the cloud environment, an instance of the updated first service in the cloud environment without redeploying the one or more dependent services executing in the cloud environment comprises:
updating a first class loader based on the updated source code and loading, using the updated first class loader, the instance of the updated first service into the cloud environment; and
loading, using an already populated second class loader, respective instances of the one or more dependent services into the cloud environment.

3. One or more non-transitory computer-readable storage media encoded with instructions that, when executed by one or more computers, cause the one or more computers to perform operations comprising:
deploying and executing, in a cloud environment, an initial instance of a first service developed by a developer and respective instances of one or more dependent services, wherein the cloud environment provides system resources for executing the initial instance of the first service;
receiving, by a code editor of an integrated development environment (IDE) that is in data communication with the cloud environment executing the initial instance of the first service, updated source code for the first service and an associated set of tests;

in response to receiving the updated source code:
generating, by the IDE, an updated first service from the updated source code; and
determining, by the IDE, one or more dependent services that are not affected by the updated source code and that are in interaction with the first service in the cloud environment;

providing, by the IDE to the cloud environment, the updated first service to the cloud environment and the set of tests to a test agent executing in the cloud environment;

in response to receiving the updated first service from the IDE, executing, by the cloud environment, an instance of the updated first service in the cloud environment without redeploying the one or more dependent services that are not affected by the updated source code, wherein the instance of the updated first service relies on the cloud environment to provide system resources for executing the instance of the updated first service;

performing, by the test agent, the set of tests on the executing instance of the updated first service, wherein the set of tests corresponds to the updated source code for the updated first service, and wherein performing the set of tests generates test results that are specific to the updated source code for the updated first service;

receiving, by the IDE, data representing the test results; and displaying, by the IDE, the data representing the test results on a user interface as feedback to the developer of the first service.

4. The one or more non-transitory computer-readable storage media of claim 3, wherein the test results indicate whether the updated first service complies with non-functional, performance, or security related criteria based on timings, tracing, performance metrics and other metadata related to an execution of the set of tests in the cloud environment that are displayed in the IDE as developer feedback.

5. The one or more non-transitory computer-readable storage media of claim 3, wherein the first service is a participant in an interacting set of microservices that are deployed independently to the cloud environment.

6. The one or more non-transitory computer readable-storage media of claim 3, wherein each test in the set of tests specifies an input value or precondition to a service and a corresponding expected output value or postcondition, and wherein performing the test comprises invoking the running instance of the service in the cloud environment with the precondition satisfied and comparing the postcondition or comparing an output from the running instance of the service with the expected output value.

7. The one or more non-transitory computer readable-storage media of claim 3, wherein the test results comprise a reason for a failed test.

8. The one or more non-transitory computer readable-storage media of claim 3, wherein the test agent is an application running standalone or in the cloud environment, running as a component of the local environment, or as an aspect of the IDE.

9. The one or more non-transitory computer readable-storage media of claim 3, wherein the cloud environment is a platform-as-a-service environment.

10. The one or more non-transitory computer readable-storage media of claim 3, wherein only a developer-selected subset of tests are executed for any subset of source-code, and wherein the method further comprises returning a developer-selected subset of test result information and metadata to the IDE.

11. The one or more non-transitory computer readable-storage media of claim 10, wherein the developer-selected subset of test result information is written by the IDE as a comment-block separate file in a well-defined location relative to updates within the updated source code.

12. The one or more non-transitory computer readable-storage media of claim 3, wherein the IDE or the test agent is connected to a local or remote file-system or source-code repository which is a source of updated code changes, test information, and destination for test results for the test agent.

13. The one or more non-transitory computer readable-storage media of claim 3, wherein the test agent is shared by multiple developers deploying updated code changes into the cloud environment, and wherein the test agent includes logic to coordinate, throttle, or serialize testing.

14. The one or more non-transitory computer readable-storage media of claim 3, wherein the IDE monitors code updates and in response to an updated source code being deployable, the IDE incrementally and automatically deploys updates corresponding to the updated source code to the cloud environment.

15. The one or more non-transitory computer readable-storage media of claim 3, wherein performing the set of tests by the test agent further comprises testing the network of other services.

16. A system comprising one or more computers and one or more storage devices storing instructions that are operable, when executed by the one or more computers, to implement an integrated development environment, a test agent, and a cloud environment, and to cause the one or more computers to perform operations comprising:

deploying and executing, in a Cloud environment, an initial instance of a first service developed by a developer and respective instances of one or more dependent services, wherein the cloud environment provides system resources for executing the initial instance of the first service;

receiving, by a code editor of an integrated development environment (IDE) that is in data communication with the cloud environment executing the initial instance of the first service, updated source code for the first service and an associated set of tests;

in response to receiving the updated source code:
generating, by the IDE, an undated first service from the undated source code; and
determining, by the IDE, one or more dependent services that are not affected by the updated source code and that are in interaction with the first service in the cloud environment;

providing, by the IDE to the cloud environment, the updated first service to the cloud environment and the set of tests to a test agent executing in the cloud environment;

in response to receiving the updated first service from the IDE, executing, by the cloud environment, an instance of the updated first service in the cloud environment without redeploying the one or more dependent services that are not affected by the updated source code, wherein the instance of the updated first service relies on the cloud environment to provide system resources for executing the instance of the updated first service;

performing, by the test agent, the set of tests on the executing instance of the updated first service, wherein the set of tests corresponds to the updated source code for the updated first service, and wherein performing the set of tests generates test results that are specific to the updated source code for the updated first service;

receiving, by the IDE, data representing the test results; and displaying, by the IDE, the data representing the test results on a user interface as feedback to the developer of the first service.

17. The system of claim 16, wherein the operations further comprise:

displaying, by the IDE, the data representing the test results specific to the updated first service on a user interface as developer feedback.

18. The system of claim 16, wherein the test results indicate whether the updated first service complies with non-functional, performance, or security related criteria based on timings, tracing, performance metrics and other metadata related to an execution of the set of tests in the cloud environment that are displayed in the IDE as developer feedback.

19. The system of claim 16, wherein the first service is a participant in an interacting set of microservices that are deployed independently to the cloud environment.

20. The system of claim 16, wherein each test in the set of tests specifies an input value or precondition to a service and a corresponding expected output value or postcondition, and wherein performing the test comprises invoking the running instance of the service in the cloud environment with the precondition satisfied and comparing the postcondition or comparing an output from the running instance of the service with the expected output value.

21. The system of claim 16, wherein the test results comprise a reason for a failed test.

22. The system of claim 16, wherein the test agent is an application running standalone or in the cloud environment, running as a component of the local environment, or as an aspect of the IDE.

23. The system of claim 16, wherein the cloud environment is a platform-as-a-service environment.

24. The system of claim 16, wherein only a developer-selected subset of tests are executed for any subset of source-code, and wherein the method further comprises returning a developer-selected subset of test result information and metadata to the IDE.

25. The system of claim 24, wherein the developer-selected subset of test result information is written by the IDE as a comment-block separate file in a well-defined location relative to updates within the updated source code.

26. The system of claim 16, wherein the IDE or the test agent is connected to a local or remote file-system or source-code repository which is a source of updated code changes, test information, and destination for test results for the test agent.

27. The system of claim 16, wherein the test agent is shared by multiple developers deploying updated code changes into the cloud environment, and wherein the test agent includes logic to coordinate, throttle, or serialize testing.

28. The system of claim 16, wherein the IDE monitors code updates and in response to an updated source code being deployable, the IDE incrementally and automatically deploys updates corresponding to the updated source code to the cloud environment.

29. The system of claim 16, wherein performing the set of tests by the test agent further comprises testing the network of other services.

* * * * *